United States Patent [19]

Crissy et al.

[11] 3,926,467
[45] Dec. 16, 1975

[54] AIRCRAFT CARGO HOOK
[75] Inventors: Charles F. Crissy, Jackson; Owen W. Sherwin, Spring Arbor; Christopher L. T. Corbin, Jackson, all of Mich.
[73] Assignee: Aeroquip Corporation, Jackson, Mich.
[22] Filed: Mar. 4, 1974
[21] Appl. No.: 447,643

[52] U.S. Cl................................. 294/83 R
[51] Int. Cl.²............................ B66C 1/34
[58] Field of Search ......... 294/83 R, 83 A, 83 AB, 294/82 R; 24/230 AP, 232; 244/137 R

[56] References Cited
UNITED STATES PATENTS

| | | | |
|---|---|---|---|
| 1,368,647 | 2/1921 | Myers | 294/83 R |
| 2,789,468 | 4/1957 | Burns | 294/83 R |
| 3,061,355 | 10/1962 | Cozzoli | 294/83 R |
| 3,208,787 | 9/1965 | Cozzoli | 294/83 R |
| 3,224,804 | 12/1965 | Campbell | 294/83 R |
| 3,575,459 | 4/1971 | Coblenz | 294/83 R |
| 3,630,562 | 12/1971 | Metz | 294/83 R |
| 3,762,757 | 10/1973 | Epstein | 294/83 R |
| 3,807,784 | 4/1974 | Laky | 294/83 R |

Primary Examiner—Richard A. Schacher
Assistant Examiner—Jeffrey V. Nase
Attorney, Agent, or Firm—Beaman & Beaman

[57] ABSTRACT

A releasable hook for cargo support, such as commonly used with helicopters, including a pivotally mounted load arm held in the load supporting position by a pivotally mounted latch arm whose position is controlled by a pivotally mounted latch. The relationships of interengaging surfaces to hold the load arm in position is such that disengaging surfaces roll relative to each other and relatively low loads result at critical locations, the apparatus operates with low release forces and improved life and dependability is achieved as compared with previously known cargo hook constructions.

7 Claims, 8 Drawing Figures

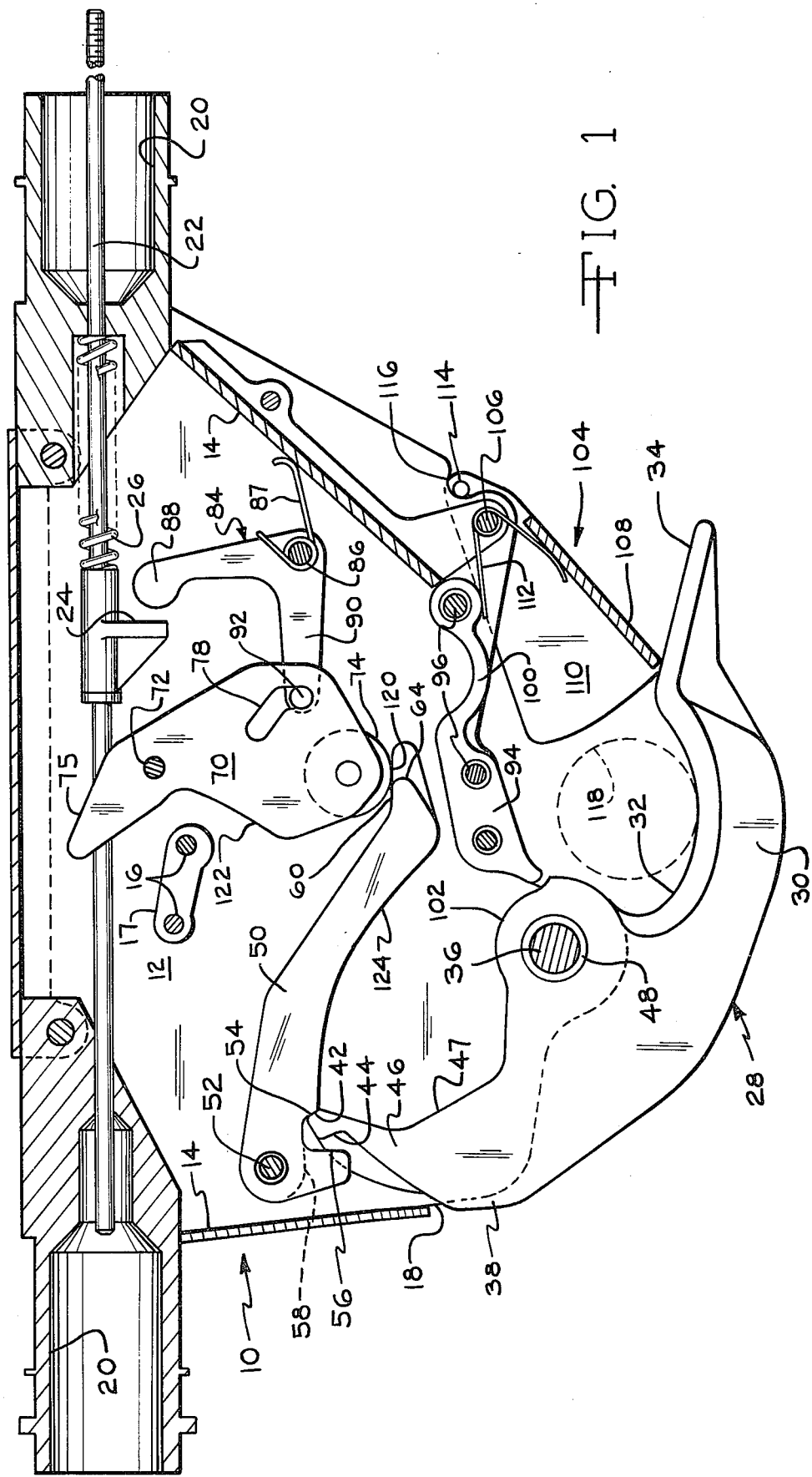

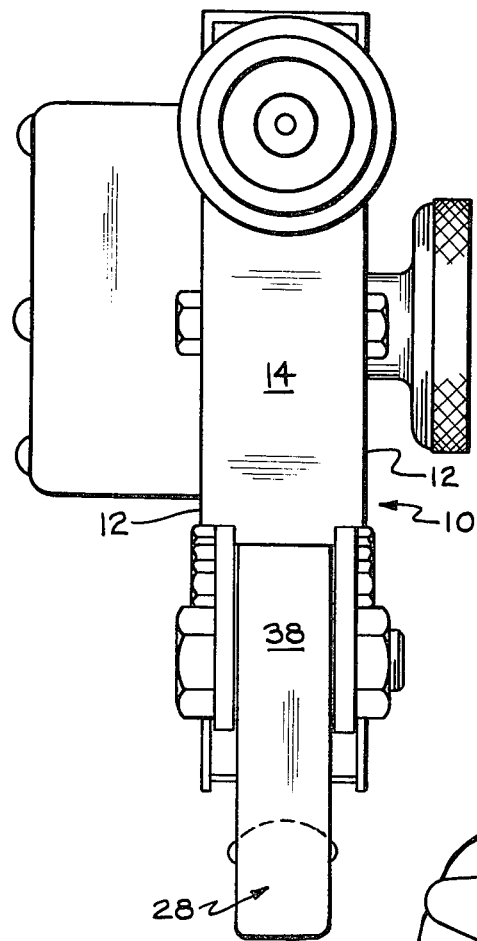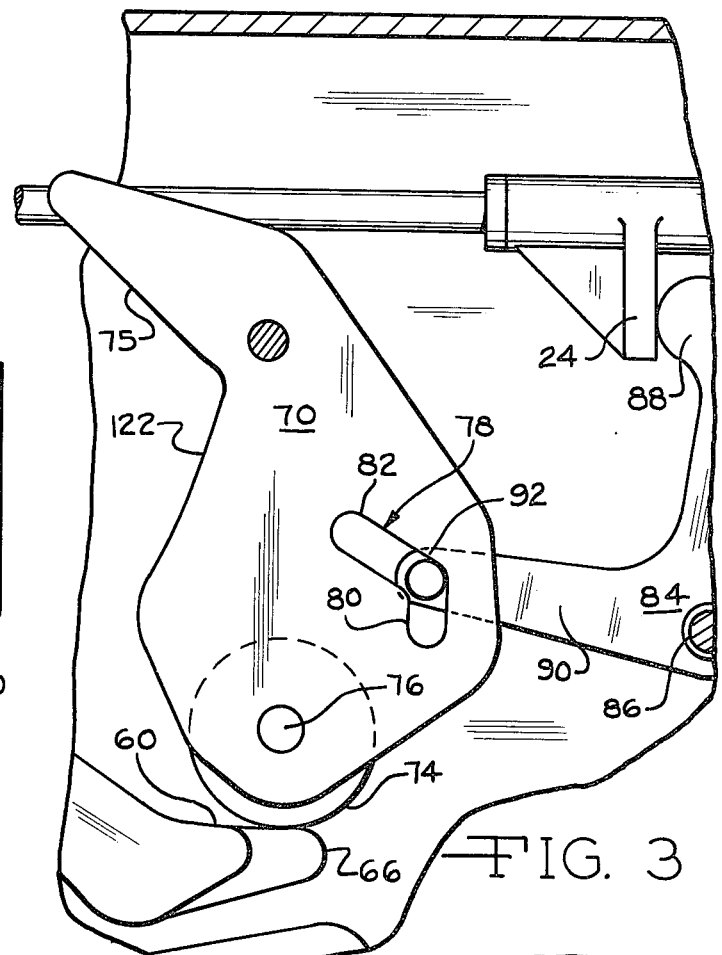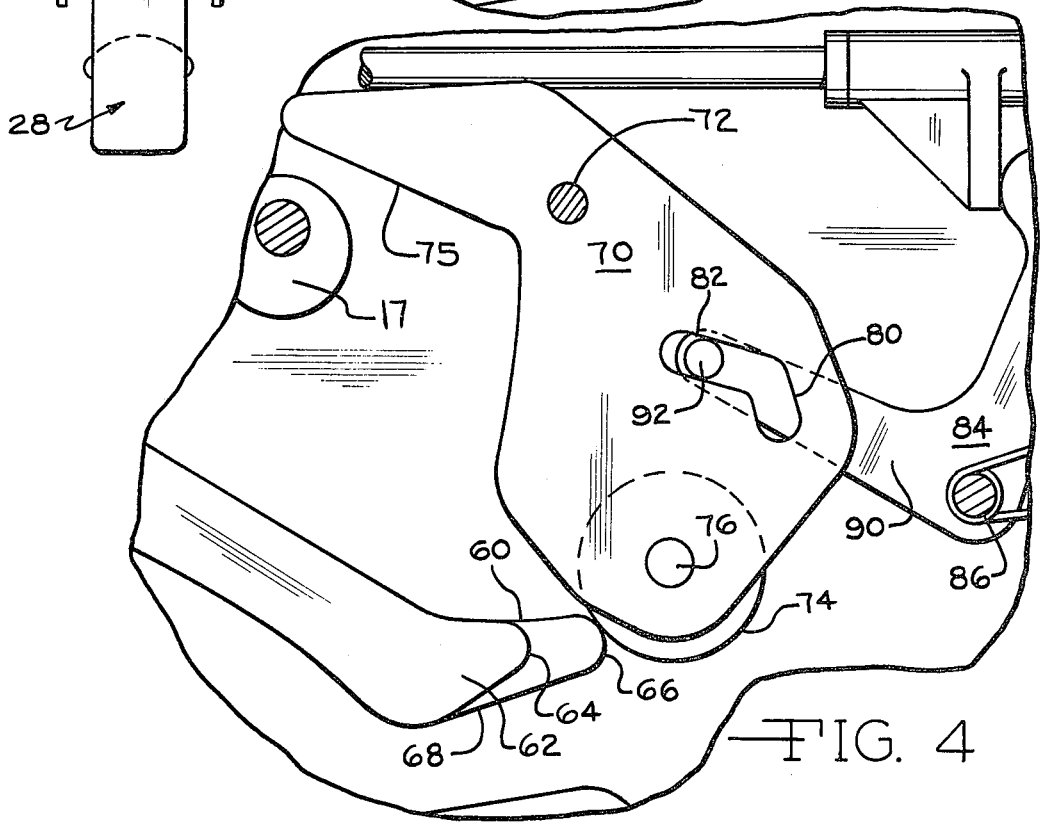

AIRCRAFT CARGO HOOK

BACKGROUND OF THE INVENTION

The invention pertains to the field of releasable cargo hooks wherein a suspended load may be quickly released from supporting structure.

Airlift techniques utilizing helicopters or other aircraft require that loads suspended externally below the aircraft be readily and completely released from the aircraft when desired. As the release of such cargo suspended beneath a helicopter may occur under combat conditions it is most important that the cargo hook be dependable in operation and readily operable. Further, aircraft cargo lift procedures require high safety precautions, and thus, while a cargo hook must be capable of readily releasing its load, premature or accidental release of the load must not occur.

Releasable hook constructions for aircraft, and the like, are available wherein releasing forces are produced electrically, by explosive charge, or manually. Such releasable hook constructions usually employ locking dog and detent arrangements wherein a sliding interaction between locking abutment surfaces is required to produce release of the cargo.

As the weight of the load suspended from the hook may be in excess of 10,000 pounds, it will be appreciated that considerable wear occurs on abutment surfaces separated by sliding contact. Further, as conventional dog and detent constructions for maintaining hooks in the closed position produce very high pressures on the edges of the dogs and abutment surfaces immediately prior to release, the rounding of the corners of dog and detent surfaces occurs, and the failure of such corners is also possible. As such wear occurs dependability of the hook is adversely affected and the safety aspect compromised.

Also, known releasable cargo hooks are readily susceptible to malfunctioning due to foreign matter entering the moving parts, and cleaning of the prior art release hooks is difficult to achieve without completely disassemblying the apparatus. Prior art cargo hooks are typified by the assignee's Patent 2,965,409.

SUMMARY OF THE INVENTION

It is an object of the invention to provide a releasable cargo hook capable of supporting heavy suspended loads with a high degree of safety, yet dependable in operation when release is desired.

Another object of the invention is to provide a releasable cargo hook capable of supporting heavy suspended loads, yet operable with relatively low release forces.

Another object of the invention is to provide a releasable cargo hook utilizing abutting load surfaces to maintain the cargo hook in the load supporting position, and during release of the hook a rolling disengagement of interengaging surfaces is employed to reduce friction, lower release forces and reduce wear.

It is also an object of the invention to provide a releasable cargo hook which is relatively difficult to contaminate with foreign matter, is cleanable with the hook in the open position and is, to an extent, self-cleaning.

An additional object of the invention is to provide a releasable cargo hook utilizing a pivoted load arm wherein the load arm is biased toward the closed or load suspending position without the use of springs.

In the practice of the invention a pair of spaced plates define a housing support member between which a load arm, latch arm, latch and lock arm are pivotally mounted. These components pivot about axes substantially parallel to each other, and operate in the same general plane. Abutment surfaces defined on the load arm and latch arm interengage to prevent pivoting of the load arm from the load supporting position, and the latch arm is maintained in position by the latch, which has a rolling interrelationship with the latch arm. The lock arm controls the position of the latch through a cam follower and a cam surface formed as a notch, and the configuration of the cam notch, and the interrelationship of the pivot points and force points of the latch are substantially "on center" during locking such that high loads may be supported in a safe manner, yet the release forces necessary to permit opening of the load arm are relatively small.

The load arm is counterweighted to be biased toward a closed position under normal circumstances due to gravitational force, and the load arm is provided with a positioning surface which engages the latch arm while the load arm is pivoting in the open position which maintains the latch arm in the condition required for resetting the load arm.

A synthetic bumper spring serves a threefold purpose as it functions to absorb shock limiting the opening of the load arm, and further functions as a shock absorber as the load arm closes. The bumper additionally serves as a seal to enclose the lower region of the housing support not occupied by the load arm.

BRIEF DESCRIPTION OF THE DRAWINGS

The aforementioned objects and advantages of the invention will be appreciated from the following description and accompanying drawings wherein:

FIG. 1 is an elevational, sectional view of a cargo hook in accord with the invention illustrating the load arm in the closed load supporting position, FIG. 2 is an end elevational view of the hook as taken from the left of FIG. 1, FIG. 3 is an enlarged, detail, elevational view of the latch arm, latch and lock arm illustrating the lock arm cam follower in its uppermost position just prior to producing latch movement, FIG. 4 is an enlarged, detail view similar to FIG. 3 illustrating the relationship of the cam follower and cam notch during displacement of the latch.

DESCRIPTION OF THE PREFERRED EMBODIMENT

Figure 5:
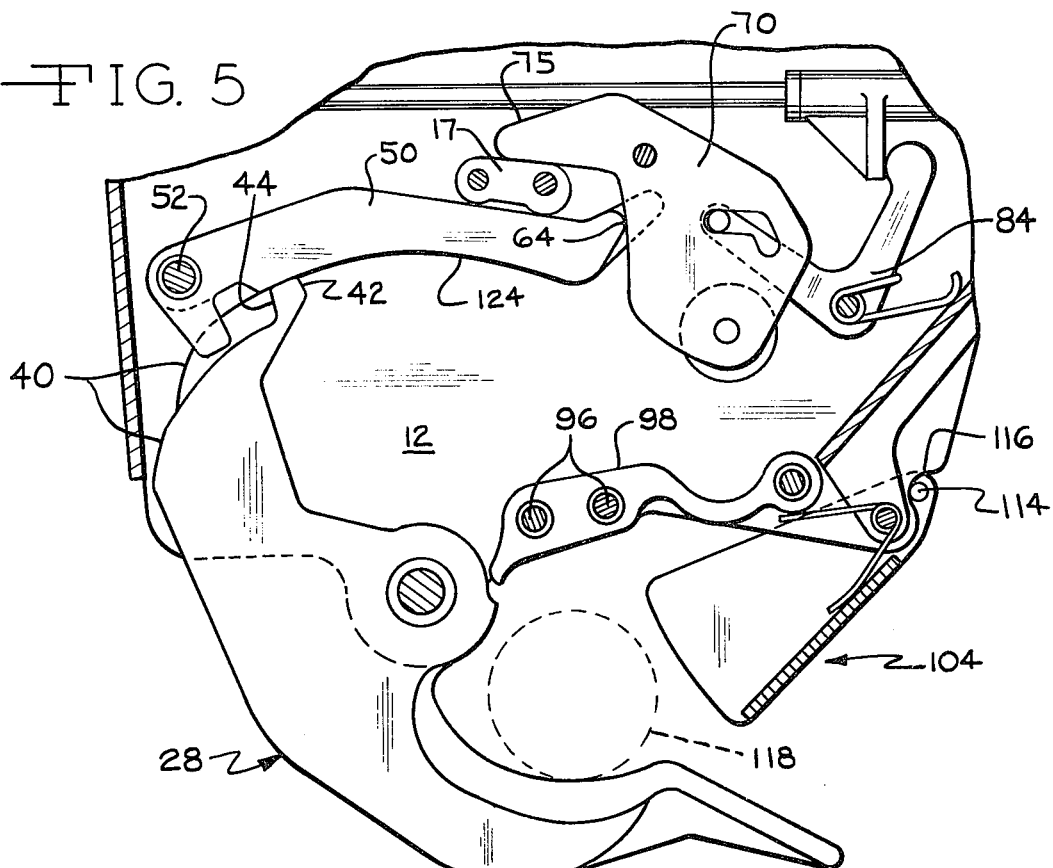
FIG. 5 is a detail, elevational view of the hook components illustrating the relationship of the components during load arm opening and immediately after disengagement of the load abutment surfaces.

As the cargo hook in accord with the invention is usually used with aircraft, such as helicopters, it is normally mounted to aircraft structure, or may be suspended from a supporting harness suspended from the aircraft. As the means for mounting the cargo hook assembly forms no part of the invention no supporting structure is illustrated.

The overall relationship of components in accord with a cargo hook constructed within the scope of the invention will be apparent in FIGS. 1 and 2. The cargo hook housing support 10 basically consists of a pair of parallel spaced side plates 12 having end walls 14. Spacer bolts and sleeves 16 of conventional construction are employed to maintain the spacing and relationship of the side plates and a synthetic elastomer bumper 17 is mounted thereon. The lower edge of the housing support is open at 18, FIG. 1, and the upper regions of the housing include a pair of adapter sockets 20, FIG. 1, which receive release rod structure.

The manual release rod 22 extends through concentric holes defined in the adapters 20, and the release rod is capable of axial reciprocation under the influence of manual actuators, not shown, attached to the end of the rod. The rod includes a push plate 24 affixed thereto, and a compression spring 26 interposed between the push plate and the right adapter, FIG. 1, biases the rod 22 toward the left.

The load suspended from the hook apparatus is directly suspended from the pivoted load arm 28. The load arm 28 is of the configuration which will be appreciated from FIG. 1 having a load engaging portion 30 defining a concave cable or tension member receiving surface 32, and a throat surface 34. On the other side of the load arm pivot pin 36 the load arm includes a weighted portion 38 on which is defined the peripheral surface 40, a load bearing abutment surface end 42, and a reset abutment surface 44 defined on boss 46. A bumper engaging surface 47 is also formed on portion 38. The weight distribution of the load arm 28 is such that with the support 10 oriented to the horizontal as viewed in FIG. 1, the load arm will tend to pivot in a counterclockwise direction under the influence of gravitational forces.

The pivot pin 36 extends between the side plates 12, and is of a substantial diameter, extending through the bearing sleeve 48 wherein the load arm may freely pivot upon the bearing sleeve.

Control of the pivoting of the load arm is by the latch arm 50 pivotally mounted upon pivot pin 52 extending between side plates 12. The latch arm includes, at a location adjacent the pivot pin 52, a load bearing abutment surface 54, and spaced therefrom to the left, FIG. 1, a reset abutment surface 56. The latch arm is recessed at 58, away from the viewer in FIG. 1, wherein the reset abutment surface 56 projects toward the viewer above the recessed portion 58.

The free end of the latch arm 50 is provided with an upwardly extending concave surface 60, and the free end is formed with a boss 62 forming an abutment surface 64. The outer end of the latch arm is rounded at 66, and includes a substantially linear surface 68 which cooperates with the shock absorbing bumper, as will be later described.

The position of the latch arm 50 is controlled by the latch 70. The latch 70 includes a plate pivotally mounted upon a pivot pin 72 interposed between the support plates 12. The latch 70 includes at its lower region, a roller 74 freely rotatable about the pivot 76 mounted in the latch, and at its upper region, an extension 75 is defined for engagement with bumper 17. A cam surface defined as notch 78 is formed in the latch and includes a latch locking portion 80 and a latch actuating portion 82. The latch 70 may be constructed by a pair of spaced plate members wherein the roller 74 is interposed therebetween, and the end portion of the latch arm 50 is aligned between the latch plates behind the outermost latch plate as viewed in FIG. 1 as to pass therebehind, as will be described. The latch arm surface 60 is formed as a radius concentric with pivot 72 when engaged by roller 74.

The position of the latch 70 is regulated by the lock arm bell crank 84. The lock arm 84 is fixedly mounted upon the pivot pin 86 mounted in the side plates 12 and is biased in the counterclockwise direction by spring means 87. The lock arm includes an arm portion 88 in alignment with the push plate 24 wherein movement of the rod 22 and plate 24 to the right engages the lock arm portion 88 and pivots the lock arm in a clockwise direction. The lock arm lever portion 90 includes a cam follower 92 received within the cam notch 78 of the latch, and if the latch is formed by a pair of spaced parallel plates it will be appreciated that the cam surface notch will be formed in both latch plates, and the cam follower 92 will be of sufficient length extending through the lock arm to engage both cam surface notches.

It is usually desirable that aircraft releasable cargo hooks be electrically operated as well as mechanically, and thus electrical solenoid means, not shown, may be utilized to pivot the lock arm 84 in addition to actuation of the lock arm being manually achievable by reciprocation of the rod 22.

A shock absorbing bumper 94, preferably formed of a synthetic material having elastic characteristics, is mounted within the housing support opening 18 upon tie bolts 96 extending between the support sides. The bumper includes a substantially flat surface 98 and a concave portion 100. As the bumper 94 closes a portion of the opening 18, and as the left end, FIG. 1, is disposed adjacent the cylindrical surface 102 defined on the load arm 28 it will be appreciated that the bumper 94 serves to seal the interior portion of the housing.

Figure 6:
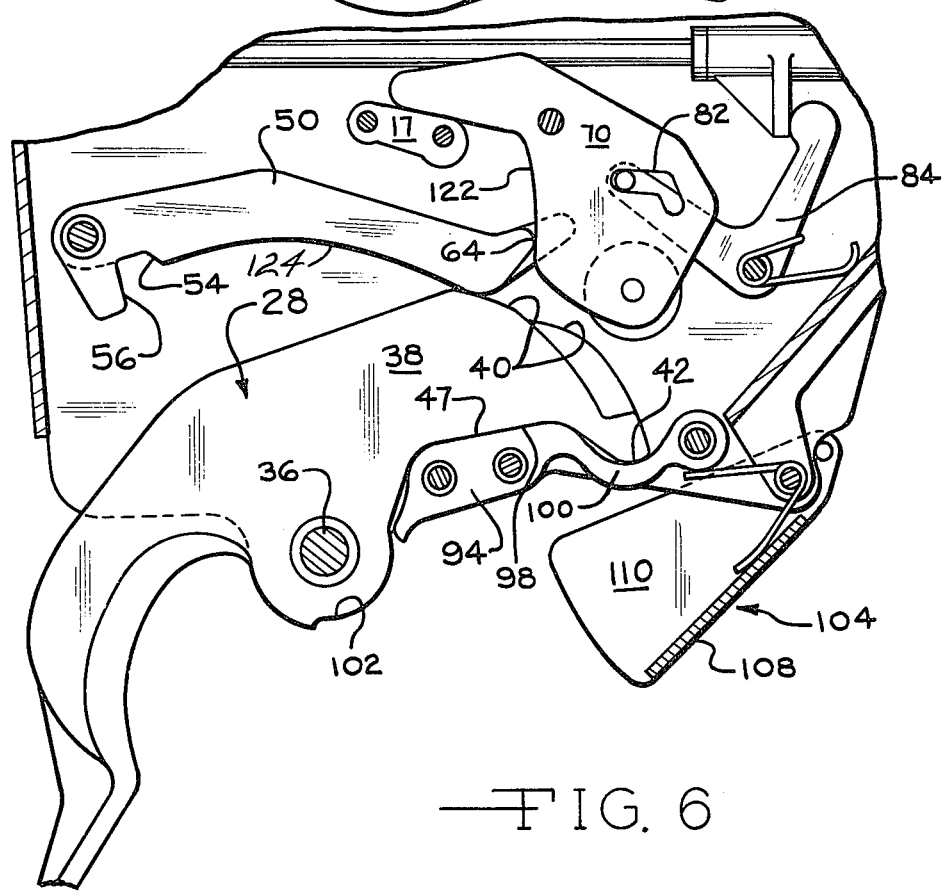
FIG. 6 illustrates the components with the load arm fully opened.

In order to maintain the load cable, web or ring upon the load arm surface 32 a retainer 104 is pivotally mounted upon the housing support upon pivot pin 106. The retainer 104 is of a U-shaped configuration including base 108 and legs 110, and is biased in a counterclockwise direction by torsion spring 112. Counterclockwise rotation of the retainer is limited by a stop pin 114 mounted upon the retainer engaging a recessed notch 116 defined on the support plates 12. Thus, when the load arm 28 is in the open position the counterclockwise rotation of the retainer will be limited by engagement of the pin 114 with the notch 116 as shown in FIGS. 5 and 6.

When it is desired to load the load arm 28 a cable, load ring 118 or web is inserted into the load arm over the throat surface 34 displacing the retainer 104 upwardly until the load may be placed on the load arm surface 32. Thereupon, the retainer 104 will snap back into the position shown in FIG. 1, and the load is positively retained upon the load arm and may not be displaced therefrom due to the retainer base 108, and the legs 110 thereof.

The normal closed condition of the load arm 28 under load is illustrated in FIG. 1. The load arm 28 is biased clockwise by the load and abutment surface 42 will be engaging the latch arm abutment surface 54. The lock arm 84 will be in that position wherein the cam follower 92 is located in the locking portion 80 of the cam surface, and the latch 70 will thus be oriented in a substantially vertical manner as illustrated in FIG. 1. The latch arm surface 60 will be engaging the latch roller 74 and thus counterclockwise rotation of the latch arm is prevented by this relationship, and the radius of surface 60 accurately locates roller 74 on the surface.

After loading, the load is transferred to the desired location by the aircraft. Release of the load is accomplished by rotating the lock arm 84 in a clockwise direction. Such rotation may be accomplished electrically by conventional means, not shown, or by a manual translation of release rod 22 to the right.

During the initial rotation of the lock arm, the cam follower 92 will move with the cam portion 80 from the position of FIG. 1, to substantially the position of FIG. 3. The locking portion 80 of the cam notch is substantially concentric to the lock arm pivot 86, and thus this initial rotation of the lock arm causes no displacement of the latch. It is to be noted that the engagement point 120 between the latch arm 50 and the roller 74, the axis of the roller pivot 76, and the axis of the latch pivot 72 are substantially in line with each other as insured by the radius of surface 60. Thus, the forces imposed upon the latch by the latch arm are substantially "dead center" and such forces do not tend to impose a rotative force upon the latch regardless of their magnitude.

As the cam follower 92 enters the cam portion 82 due to continued clockwise rotation of the lock arm 84 the latch 70 will be pivoted in a counterclockwise direction, causing the roller 74 to roll to the right on the surface 60, FIG. 3. Such translation of the roller 74 on the surface 60 continues until the roller clears the rounded end 66 of the latch arm as illustrated in FIG. 4. At this time the force imposed upon the latch arm due to the engagement of the abutment surfaces 42 and 54 tending to rotate the latch arm in a counterclockwise direction causes the latch arm to rotate upwardly past the roller 74, FIG. 5. During this upward movement of the free end of the latch arm the surface 60 portion will pass behind the latch plate and the latch arm abutment 64 will engage the latch surface 122, which is substantially concentric to the latch arm pivot 52. In this manner the latch 70 will be maintained in the position of FIGS. 5 and 6 during opening of the load arm 28. The rapid upward movement of latch arm 50, and the rotation of latch 70, is absorbed by engagement of the components with bumper 17, FIG. 5.

The counterclockwise rotation of the latch arm 50, once the roller 74 is disengaged, causes the latch arm abutment surface 54 to move away from engagement with the load arm abutment surface 42 freeing the load arm 28 for pivoting in a clockwise direction under the influence of the force imposed on the surface 32 by the load ring 118. FIG. 5 illustrates the position of the components immediately after disengagement of the abutment surfaces 42 and 54.

The high forces imposed upon the load arm cause the load arm to rapidly pivot to its maximum clockwise position as shown in FIG. 6 to release the load. In this position the abutment surface 42 engages and deflects the resilient portion 100 of the bumper 94 and surface 47 engages surface 98 and the bumper absorbs the shock of the opening of the load arm. It will also be noted from FIG. 6 that although the latch arm 50 tends to fall under the influence of gravity during opening of the load arm, the load arm surface 40 engages the latch arm surface 124 which is substantially concentric to pivot pin 36 and maintains the latch arm in proper relationship for resetting and for holding the latch 70 in its release position.

Figure 7:
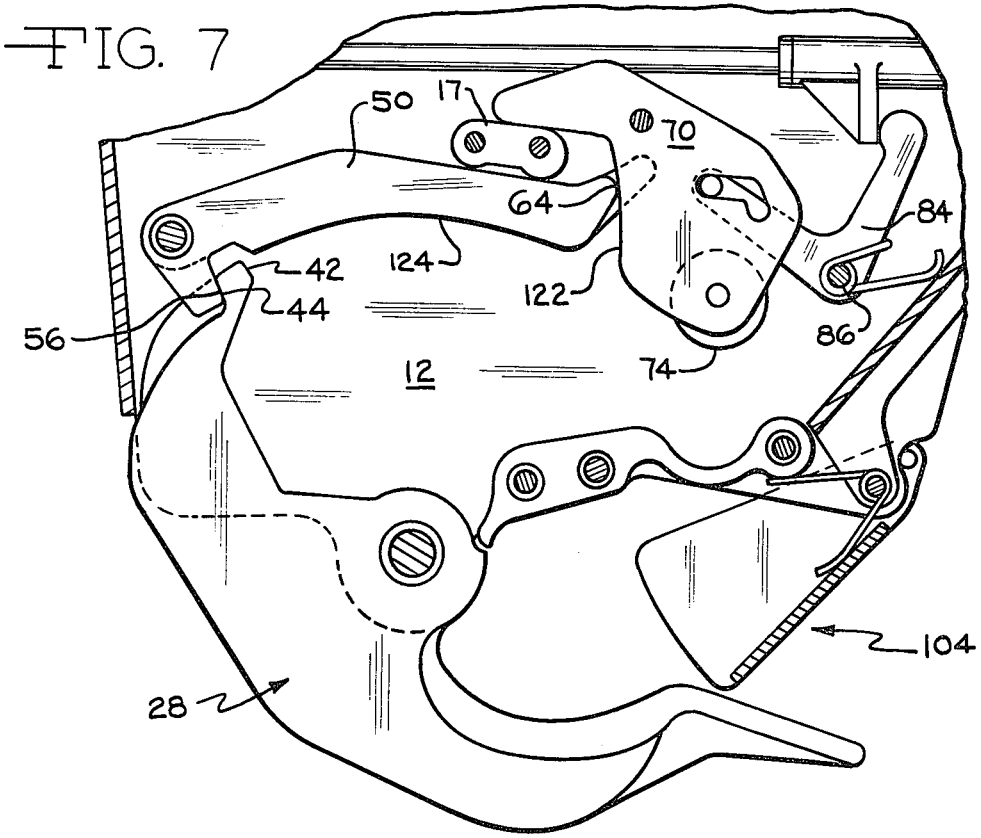
FIG. 7 is an elevational view illustrating the relationship of components during initial engagement of the reset abutment surfaces.
Figure 8:
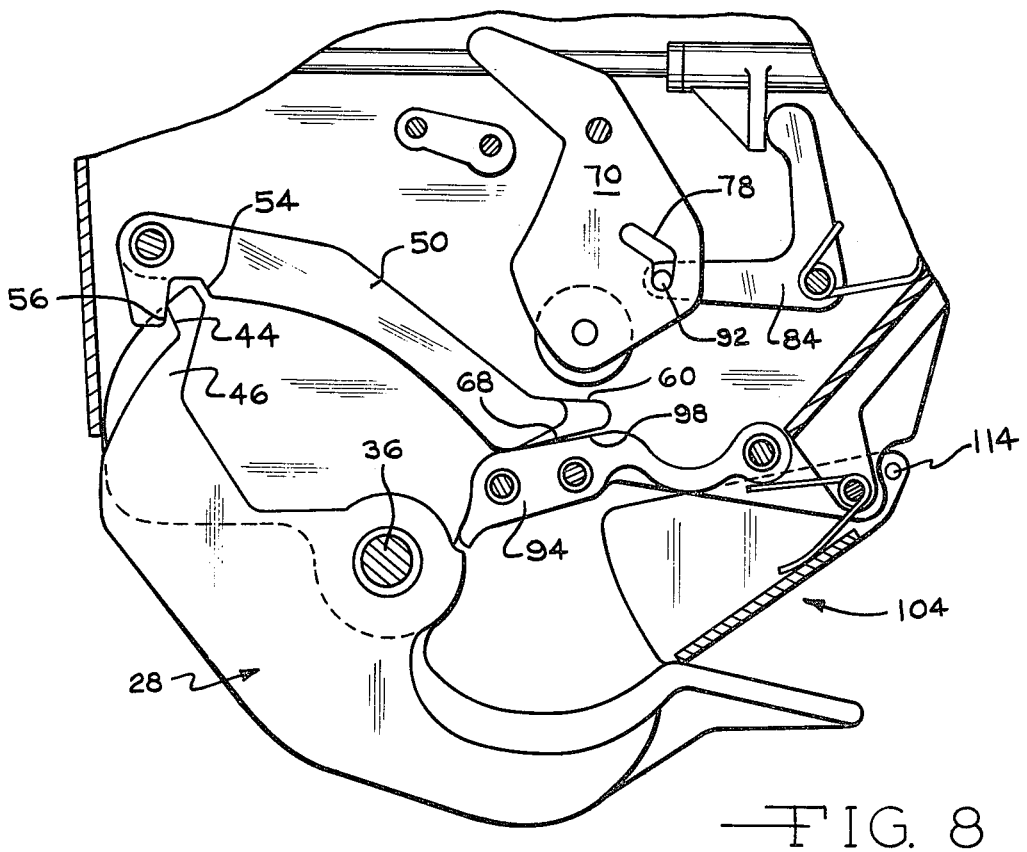
FIG. 8 illustrates the hook components at the position terminating the resetting of the load arm with the latch arm in engagement with the bumper.

The resilient nature of the bumper 94, and the counterweighted distribution of the mass of the load arm causes the load arm to immediately rotate in a counterclockwise direction after the load has been released and the relationship shown in FIG. 6 has occurred. During this counterclockwise rotation of the load arm from the open position toward the closed position the surface 40 slides along the latch arm surface 124, and thus the latch arm will continue to be maintained in its proper reset orientation during the return movement of the load arm. Counterclockwise rotation of the load arm occurs until the reset abutment surface 44 engages the latch arm reset abutment surface 56 as shown in FIG. 7. This engagement of the reset surfaces causes the latch arm 50 to be rapidly pivoted downwardly until the latch arm surface 68 engages with the bumper upper surface 98 as illustrated in FIG. 8. This downward movement of the latch arm occurs unhindered in that the latch arm abutment 64 engaging the latch surface 122 maintains the latch and latch roller out of an interfering relationship with the end of the latch arm.

Once the latch arm 50 has been pivoted to the position of FIG. 8 out of engagement with the latch surface 122, the latch 70 rotates to the vertical orientation of FIG. 8 under the influence of the biased lock arm and cam follower 92 to again be superimposed above the free end of the latch arm and the cargo hook is reset and ready to support the next load.

Of course, the sequence of steps occurring between FIGS. 4 and 8 take place very rapidly, yet the use of the bumpers 17 and 94 prevents damage to the rapidly moving components. The long travel, double action release wherein the initial rotation of the lock arm 84 merely unlocks the mechanism, and the significant movement of roller 74 on surface 60, imparts an important safety feature to the apparatus, as no movement of the load 28 occurs until the roller 74 passes the outer end of the latch arm. All of the loads on the various surfaces during release are rolling or semi-rolling and thus high wear sliding relationships between surfaces is eliminated. Further, the structural relationship of the components prevents the requirement for overcoming an "overcenter" force at high load, and sharp edges are not required to pass over each other resulting in accelerated wear conditions.

As the abutment surfaces 42 and 54 are disposed close to the pivot 52, and as the abutment surface 42 is significantly spaced from the pivot pin 36, and as the roller 74 engages the latch arm 50 at a position significantly spaced from the pivot pin 52, these relationships of the components produce low loads on the locking mechanism as compared with known configurations and such construction results in high reliability, low wear and low release forces. Such low release loads permit the release actuating apparatus to be relatively simple in construction and easy to operate.

As will be noted in FIG. 1, the configuration of the load arm 28 is such that the portion 38 thereof substantially seals that portion of the housing support opening 18 which is not sealed by the bumper 94. Thus, the likelihood of foreign matter entering the housing support is reduced, and the latch arm, latch and lock arm are capable of dependable operation even under adverse operating conditions.

It is appreciated that various embodiments of the inventive concepts may be apparent to those skilled in the art without departing from the spirit and scope of the invention.

We claim:

1. A self resetting cargo hook comprising, in combination, a support, a load arm pivotally mounted on said support pivotal about an axis between a closed load supporting position and an open load releasing position, a first abutment surface defined on said load arm radially spaced from said axis, a latch arm lever pivotally mounted at one end on said support on an axis parallel to said load arm axis and having a free end, a second abutment surface defined on said latch arm adjacent said pivotally mounted end, said latch and load arms having a coincident plane of operative movement, said latch arm being pivotal between a first position whereby said first abutment engages said second abutment preventing pivoting of said load arm from said closed load supporting position to said open load releasing position, and a second position disengaging said first and second abutments permitting said load arm to pivot to said open position, a latch pivotally mounted on said support selectively engageable with said latch arm free end selectively maintaining said latch arm in said first position thereof and releasing said latch arm for movement to said second position thereof, a first reset abutment defined on said load arm, a second reset abutment defined on said latch arm adjacent said pivotally mounted end, said first reset abutment engaging said second reset abutment upon said load arm pivoting from said open position to said closed position to align said first and second abutments and position said latch arm to its said first position, and latch operating means connected to said latch controlling the position of said latch with respect to said latch arm free end.

2. In a cargo hook as in claim 1, latch arm retaining means defined on said load arm engaging said latch arm to position said latch arm to engage said latch during pivoting of said load arm to said open position, said engagement of said latch by said latch arm holding said latch in a reset ready position out of interference with pivoting of said latch arm.

3. In a cargo hook as in claim 2 wherein said load arm is located vertically below said latch arm and said retaining means comprises a cam surface defined on said load arm.

4. In a cargo hook as in claim 1 wherein said latch is pivotally mounted on said support on an axis substantially parallel to said load arm axis, and said latch operating means comprises a lock arm lever pivotally mounted upon said support pivotal about an axis substantially parallel to said latch axis, a cam surface defined on said latch, and a cam follower mounted on said lock arm lever engaging said cam surface whereby movement of said lock arm lever operates said latch.

5. In a cargo hook as in claim 4, a roller rotatably mounted on said latch having an axis parallel to the pivot axis of said latch, said roller engaging said latch arm at said first position thereof.

6. A cargo hook comprising, in combination, a support, a load arm pivotally mounted on said support pivoted about an axis between a closed load supporting position and an open load releasing position, load arm retaining means mounted on said support selectively movable between load arm retaining and releasing positions for retaining and releasing said load arm with respect to said closed position, said retaining means having first and second sequential stages of operative movement, said first stage of movement unlocking said retaining means from said load arm retaining position and said second stage translating said retaining means toward said load arm releasing position, said retaining means including a pivoted arm and a pivoted latch, a first reset abutment defined on said load arm, a second reset abutment defined on said pivoted arm, said first reset abutment engaging said second reset abutment upon said load arm pivoting from said open position to said closed position to position said pivoted arm to the load arm retaining position, said latch having a pivot axis and a roller rotatably mounted on said latch having an axis, said pivoted arm having a contact surface selectively engageable with said roller, said contact surface having a concave radius having a center of generation approximately corresponding to said latch pivot axis when said contact surface and roller are in engagement, said roller axis being in alignment with said latch pivot axis and the point of contact of said roller and contact surface when said retaining means is in said load arm retaining position, and operating means mounted on said support connected to said retaining means for the operation thereof.

7. In a cargo hook as in claim 6 wherein said operating means includes a pivoted lever mounted upon said support having a cam follower mounted thereon, a cam slot defined on said latch receiving said cam follower and having first and second portions, movement of said cam follower within said first cam slot portion comprising said first stage of operative movement and movement of said cam follower within said second cam slot portion comprising and producing said second stage of operative movement.

\* \* \* \* \*